(12) United States Patent
Moffitt et al.

(10) Patent No.: US 10,279,952 B2
(45) Date of Patent: May 7, 2019

(54) SYRUP DISPENSING CUPS AND METHODS FOR IMPROVED SHELF-LIFE

(71) Applicant: The Coca-Cola Company, Atlanta, GA (US)

(72) Inventors: Ronald D. Moffitt, Spartanburg, SC (US); T. Edwin Freeman, Woodstock, GA (US); Yu Shi, Marietta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 15/769,553

(22) PCT Filed: Oct. 21, 2016

(86) PCT No.: PCT/US2016/058192
§ 371 (c)(1),
(2) Date: Apr. 19, 2018

(87) PCT Pub. No.: WO2017/070521
PCT Pub. Date: Apr. 27, 2017

(65) Prior Publication Data
US 2018/0305073 A1 Oct. 25, 2018

Related U.S. Application Data

(60) Provisional application No. 62/245,894, filed on Oct. 23, 2015.

(51) Int. Cl.
*B65D 8/00* (2006.01)
*B29C 65/00* (2006.01)
*B67D 1/04* (2006.01)

(52) U.S. Cl.
CPC .............. *B65D 11/02* (2013.01); *B29C 66/71* (2013.01); *B65D 2543/00296* (2013.01); *B67D 1/0406* (2013.01)

(58) Field of Classification Search
CPC .......... B65D 11/02; B65D 2543/00296; B67D 1/0406; B29C 66/71
See application file for complete search history.

(56) References Cited

U.S. PATENT DOCUMENTS 4,709,835 A 12/1987 Kruger et al.
4,848,596 A 7/1989 Rudick
(Continued)

FOREIGN PATENT DOCUMENTS

EP 0572617 B1 2/1997

OTHER PUBLICATIONS

International Search Report and Written Opinion for PCT/US2016/058192 dated Jan. 17, 2017.

*Primary Examiner* — Michael C Miggins
(74) *Attorney, Agent, or Firm* — Eversheds Sutherland (US) LLP (57) ABSTRACT

Syrup dispensing cups are provided that include a body structure that includes a first polyester or co-polyester resin with one or more first co-monomers incorporated into the first resin at a first mol % and having an intrinsic viscosity from about 0.45 dL/g to about 1.3 dL/g when measured at a temperature of 25 C. The body structure has a first opening that is sealed with a first sealing layer and a second opening sealed with a second sealing layer, in which each sealing layer includes a second PET-based co-polyester resin having one or more second co-monomers incorporated into the second resin at a second mol %, and the ratio of the first mole % to the second mol % is less than 1. Methods for or enhancing the shelf-life of syrup dispensing cups are also provided.

18 Claims, 4 Drawing Sheets

(56) References Cited

U.S. PATENT DOCUMENTS 4,964,532 A 10/1990 Kirschner et al.
2002/0001449 A1 2/2002 Bonningue

SYRUP DISPENSING CUPS AND METHODS FOR IMPROVED SHELF-LIFE

CROSS REFERENCE TO RELATED APPLICATIONS

This application claims priority to U.S. Provisional Patent Application No. 62/245,894, filed Oct. 23, 2015, which is incorporated herein by reference, and is a 35 U.S.C. § 371 national stage application of PCT Patent Application No. PCT/US2016/058192, filed Oct. 21, 2016, which is incorporated by reference in its entirety.

TECHNICAL FIELD

This disclosure relates to syrup dispensing cups having improved shelf life, and methods and compositions for their production.

BACKGROUND

Polyesters and particularly polyethylene terephthalate (PET) have been used for packaging for many years because of their excellent mechanical properties and relatively low cost. For example, PET-based containers have found use as dispensing cups in automated cold beverage dispensing systems, in which a carbonated fluid is introduced into the cup to interact with its contents, such as syrup, to provide a mixture that is subsequently dispensed. However compared to a glass bottle or a metal container, PET-based containers allow oxygen to penetrate at a certain rates from the outside and thus have difficulty in maintaining storage stability of the contents sealed inside. Additionally, as PET-based container materials are porous, flavor scalping may occur and undesirably affect the organoleptic properties of the contents sealed in the container.

Consequently, there remains a need for improved dispensing cups, including cups for automated, carbonated cold beverage dispensing systems. The dispensing cups will desirably have extended shelf life properties and a neutral impact on the organoleptic properties of the contents sealed therein. New compositions and/or methods for making improved dispensing cups are generally needed, particularly new compositions and methods that do not undesirably alter processing and packaging performance.

SUMMARY

This disclosure provides generally new compositions and methods for syrup dispensing cups that are stable over longer periods, that is, having improved barrier properties and reduced or minimal impact on the organoleptic properties of the syrup contained therein.

Syrup dispensing cups are generally fabricated by injection molding of thermoplastic polyester resin polyethylene terephthalate (also written poly(ethylene terephthalate) or simply PET), which formally contains polymerized units of the monomer ethylene terephthalate with repeating $C_{10}H_8O_4$ moieties. Without intending to be bound by any theories or mechanisms, PET is generally synthesized from its monomer bis(2-hydroxyethyl) terephthalate, which itself can be prepared by the esterification reaction between terephthalic acid and ethylene glycol with water as a byproduct (Equation 1), or by transesterification reaction between ethylene glycol and dimethyl terephthalate with methanol as a byproduct (Equations 2 and 3). Polymerization of the resulting bis(2-hydroxyethyl) terephthalate is through a polycondensation reaction of the monomers which is effected immediately after esterification or transesterification reactions, with water as the byproduct.

Esterification (Equation 1)

Transesterification (Equations 2 and 3)

It has now been unexpectedly discovered that by employing certain diacid and/or diol co-units (co-monomers) to form PET-based co-polyester resins having certain rheological properties that acceptably permit thin-wall part injection molding within the range of commercial molding cycle times, performance improvements are achieved. It has also been unexpectedly discovered that when these features are combined with incorporating such co-monomers at a different mole percent (mol %) to form other co-polyester resins having suitable heat sealing abilities to form a sealing layer, a surprising improvement in barrier properties of the resulting syrup dispensing cup is attained.

According to one aspect, for example, this disclosure a syrup dispensing cup comprising:
  a body structure having a first end with a first opening, a second end with a second opening, a sidewall structure extending between the first end and the second end, and having an interior space, wherein the body structure comprises a first polyester or co-polyester resin comprising one or more first co-monomers incorporated into the first resin at a first mol % and having an intrinsic viscosity from about 0.45 dL/g to about 1.30 dL/g when measured at a temperature of 25° C.;
  wherein the first opening is sealed with a first sealing layer and the second opening is sealed with a second sealing layer, each sealing layer comprising a second PET-based co-polyester resin comprising one or more second co-monomers incorporated into the second resin at a second mol %; and
  wherein the ratio of the first mole % to the second mol % is less than 1.

In a further aspect, for example, this disclosure provides a method for enhancing the shelf-life of a syrup dispensing cup, the method comprising:
  a) providing a first polyester or co-polyester resin comprising one or more first co-monomers incorporated into the first resin at a first mol % and having an intrinsic viscosity from about 0.45 dL/g to about 1.30 dL/g when measured at a temperature of 25° C.;
  b) providing a body structure from the first PET-based co-polyester resin, wherein the body structure has a first end with a first opening, a second end with a second opening, a sidewall structure extending between the first end and the second end, and an interior space;
  c) sealing the first opening with a first sealing layer; and
  d) sealing the second opening with a second sealing layer,
  wherein each sealing layer comprises a second PET-based co-polyester resin comprising one or more second co-monomers incorporated into the second resin at a second mol %, and
  wherein the ratio of the first mole % to the second mol % is less than 1.

These and various other aspects and embodiments of this disclosure are illustrated in the drawings, examples, data, and detailed description that follow.

DETAILED DESCRIPTION

Aspects of this disclosure provide for new syrup dispensing cups, methods, compositions, and structures, that improve the barrier properties of certain syrup dispensing cups made from the compositions and structures. This disclosure further provides for syrup dispensing cups and their compositions and structures that are durable, heat sealable, and provide increased shelf-life while decreasing any adverse impact on the organoleptic properties of the syrup contained within the dispensing cup.

The following definitions are provided to further explain and elaborate various aspects of this disclosure.

A "polyester" resin is one that contains units derived from one dicarboxylic acid monomer species and one diol monomer species. Non-limiting suitable examples include polyethylene terephthalate (PET), polyethylene naphthalate (PEN), polyethylene furanoate (PEF), and the like, and can include a combination or mixture of polyester resins. In any instance, the long chain branched embodiment of the polyester resin can be used.

A "co-polyester" resin is a polyester resin that contains units derived from at least one other or additional dicarboxylic acid co-monomer along with the acid co-monomer in the polymer resin structure and/or at least one other or additional diol co-monomer along with the ethylene glycol co-monomer in the polymer resin structure. Non-limiting examples include FDCA, PET-based polyester, PEF-based polyester, PEN-based polyester, aliphatic or aromatic polyester, and combinations thereof. Typically, the mole fraction or percentage of the total other dicarboxylic co-monomers is less than the mole fraction or percentage of acid co-monomers in the resin. Also typically, the mole fraction or percentage of the total other diol co-monomers is less than the mole fraction or percentage of ethylene glycol co-monomers in the resin. In any instance, the long chained branched embodiments of the co-polyester resin can be used. For purposes of simplicity, although any of the foregoing polyester or co-polyester resin may be employed within the syrup dispensing cups described herein, the below disclosure is with respect to PET-based co-polyester resins. In some instances, the long chain branched version of the PET-based co-polyester resin may be utilized. Non-limiting examples include the long chain branched versions of Indorama 3301, Indorama 7804, and Eastman Eastar® EN067.

In one aspect, the disclosure provides for a syrup dispensing cup comprising a body structure having a first end with a first opening, a second end with a second opening, a sidewall structure extending between the first end and the second end, and having an interior space. The body structure comprises a first PET-based co-polyester resin comprising one or more first co-monomers incorporated into the first resin at a first mol % and having an intrinsic viscosity from about 0.45 dL/g to about 1.3 dL/g when measured at a temperature of 25° C. The first opening is sealed with a first sealing layer and the second opening is sealed with a second sealing layer, each sealing layer comprising a second PET-based co-polyester resin comprising one or more second co-monomers incorporated into the second resin at a second mol %, and wherein the ratio of the first mol % to the second mol % is less than 1. That is, the first mol % is less than the second mol %.

Figure 1:
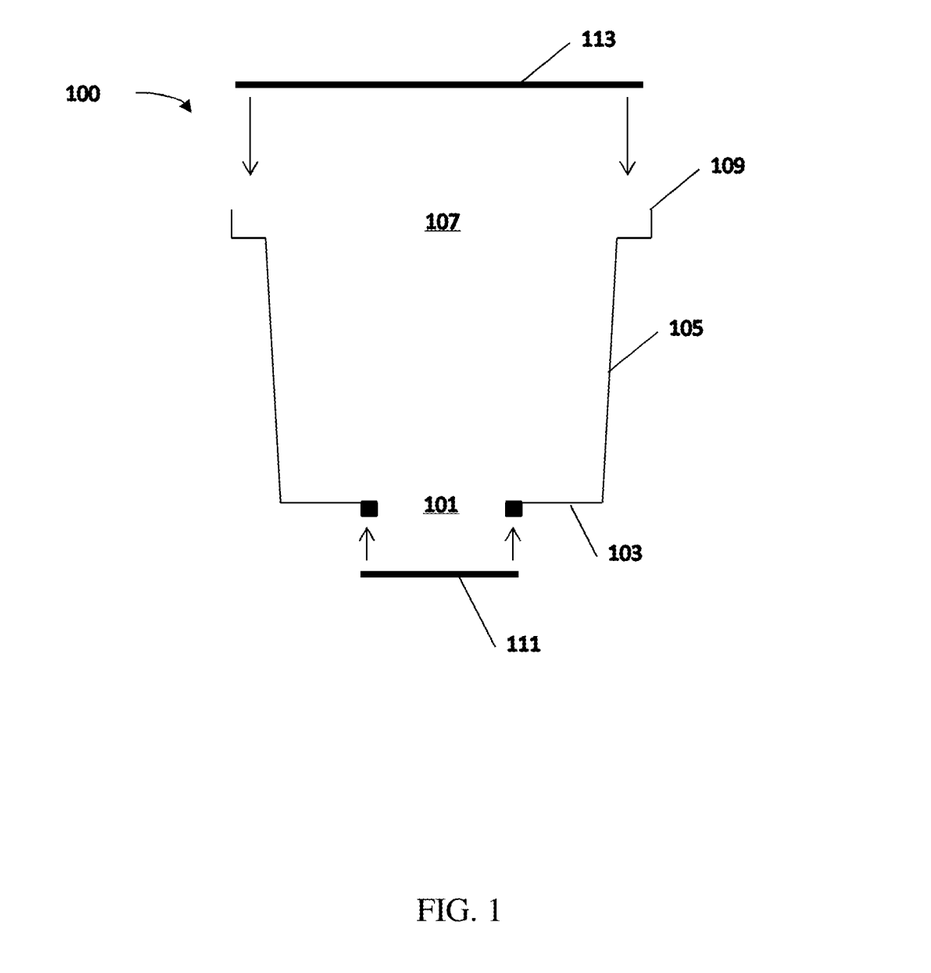
FIG. 1 illustrates a cross-sectional view of a syrup dispensing cup in accordance with an embodiment of the present disclosure.

FIG. 1 illustrates one embodiment of this disclosure, in which the syrup dispensing cup 100 is shown in cross-section. In certain instances, a silicon rubber dispensing valve with a retainer ring may be mounted to an opening to facilitate and enhance syrup mixing with the carbonated water supply, which is separate from the syrup dispensing cup 100. The syrup dispensing valve, which may assemble integral to the bottom opening 101 of the cup 100, may include a silicon rubber and may be retained, for example, with a snap-ring. In some embodiments the snap-ring comprises a polyolefin resin such as isotactic polypropylene (i-PP) or high density polyethylene (HDPE). In one instance, the silicon rubber may be configured to have a specific gravity less than water, thereby rendering it floatable in a recycling floatation bath following grinding of the cup to promote cup recyclability.

The sidewall structure 105 can take the form of any number of different structural configurations. Generally, the sidewall structure 105 can take the shape of a frustum, which is the portion of a geometric shape such as a cone or pyramid that lies between two parallel planes that cut the geometric shape. In this description, the two parallel planes correspond with the first opening 101 at the first end 103 and the second opening 107 at the second end 109. Therefore, the FIG. 1 sidewall structure 105 represents a conical frustum, having different diameter openings at the first and second ends 103, 109, and this structure will be referred to herein as a conical side wall structural configuration. The sidewall structure 105 also may have a cylindrical structural configuration in which the first and second ends have the same diameter, or the sidewall structure also may have a polyhedron structural configuration having a polygonal cross section. Non-limiting examples of suitable polygonal cross structural configurations include a triangle, a square, a rectangle, a pentagon, and an octagon.

Body Structure

According to a further aspect, the body structure can be a monolayer formed of the first PET-based co-polyester resin, in which the monolayer can have an average thickness from about 0.04 cm to about 0.10 cm, alternatively from about 0.05 cm to about 0.09 cm, or alternatively from about 0.06 cm to about 0.08 cm. In another aspect, the monolayer can have an average thickness of about 0.04 cm, about 0.05 cm, about 0.06 cm, about 0.07 cm, about 0.08 cm, about 0.09 cm, or about 0.10 cm. In a further aspect, the monolayer can have an average thickness of about 0.03 cm; alternatively, about 0.04 cm; alternatively, about 0.05 cm; alternatively, about 0.06 cm; alternatively, about 0.07 cm; alternatively, about 0.08 cm; alternatively, about 0.09 cm; alternatively, about 0.10 cm; alternatively, about 0.11 cm; or alternatively, about 0.12 cm; although other thicknesses outside these parameters are possible.

In some instances, the body structure of the syrup dispensing cups described herein is manufactured via injection molding. In injection molding, the molding conditions, particularly melt and mold temperatures, have a significant impact on the final properties of the molded material, regardless of the part design. In such instances, the first PET-based co-polyester resin selected for body structure production should have suitable rheological properties so as to facilitate efficient and effective molding. The melt rheology of the first PET-based co-polyester resin should advantageously enable injection molding to occur with plastic pressures in a range for ease of commercial manufacturing. In one instance, the plastic pressure can be from about 2,500 psig to about 44,000 psig. In another instance, the plastic pressure can be from about 4,600 psig to about 30,000 psig. In yet another instance, the plastic pressure can be from about 7,000 psig to about 20,000 psig.

The first PET-based co-polyester resin can have a peak melting temperature from about 220° C. to about 260° C. Alternatively, the first PET co-polyester resin can have a peak melting temperature from about 225° C. to about 255° C.; alternatively from about 230° C. to 255° C.; alternatively from about 235° C. to about 255° C. In another aspect, the first PET-copolyester resin can have a melting temperature of about 220° C., 221° C., about 222° C., about 223° C., about 224° C., about 225° C., about 226° C., about 227° C., about 228° C., about 229° C., about 230° C., 231° C., about 232° C., about 233° C., about 234° C., about 235° C., about 236° C., about 237° C., about 238° C., about 239° C., about 240° C., about 241° C., about 242° C., about 243° C., about 244° C., about 245° C., about 246° C., about 247° C., about 248° C., about 249° C., about 250° C., 251° C., about 252° C., about 253° C., about 254° C., about 255° C., about 256° C., about 257° C., about 258° C., about 259° C., or about 260° C.

The first PET-based co-polyester resin can have a crystalline volume fraction from about 0.02 minutes to about 0.45 minutes. Alternatively, the first PET co-polyester resin can have a crystalline volume fraction from about 0.05 minutes to about 0.40 minutes; alternatively from about 0.10 minutes to about 0.35 minutes. In another aspect, the first PET-copolyester resin can have a crystalline volume fraction of about 0.02 minutes, about 0.03 minutes, about 0.04 minutes, about 0.05 minutes, about 0.06 minutes, about 0.07 minutes, about 0.08 minutes, about 0.09 minutes, about 0.1 minutes, about 0.11 minutes, about 0.12 minutes, about 0.13 minutes, about 0.14, minutes, about 0.15 minutes, about 0.16 minutes, about 0.17 minutes, about 0.18 minutes, about 0.19 minutes, about 0.2 minutes, about 0.21 minutes, about 0.22 minutes, about 0.23 minutes, about 0.24 minutes, about 0.25, minutes, about 0.26 minutes, about 0.27 minutes, about 0.28 minutes, about 0.29 minutes, about 0.30 minutes, about 0.31 minutes, about 0.31 minutes, about 0.32 minutes, about 0.33 minutes, about 0.34, minutes, about 0.35 minutes, about 0.36 minutes, about 0.37 minutes, about 0.38 minutes, about 0.39 minutes, about 0.4 minutes, about 0.41 minutes, about 0.42 minutes, about 0.43 minutes, about 0.44, minutes, or about 0.45 minutes.

The first PET co-polyester resins as described herein can have an intrinsic viscosity from about 0.45 dL/g to about 1.3 dL/g when measured at a temperature of 25° C. Alternatively, the first PET co-polyester resins can have an intrinsic viscosity from about 0.45 dL/g to about 0.75 dL/g; alternatively, from about 0.50 dL/g to about 0.70 dL/g; and alternatively still, from about 0.55 to about 0.65 dL/g. In another aspect, the first PET co-polyester resin incorporating the diacid and/or diol co-monomers in the mole percentages disclosed herein can have an intrinsic viscosity of about 0.45 dL/g, about 0.46 dL/g, about 0.47 dL/g, about 0.48 dL/g, about 0.49 dL/g, about 0.50 dL/g, about 0.51 dL/g, about 0.52 dL/g, about 0.53 dL/g, about 0.54 dL/g, about 0.55 dL/g, about 0.56 dL/g, about 0.57 dL/g, about 0.58, about 0.59 dL/g, about 0.60 dL/g, about 0.61 dL/g, about 0.62 dL/g, about 0.63 dL/g, about 0.64 dL/g, about 0.65 dL/g, about 0.66 dL/g, 0.67 dL/g, about 0.68 dL/g, about 0.69 dL/g, about 0.70 dL/g, about 0.71 dL/g, about 0.72 dL/g, about 0.73 dL/g, about 0.74 dL/g, about 0.75 dL/g, about 0.76 dL/g, about 0.77 dL/g, about 0.78 dL/g, about 0.79 dL/g, about 0.80 dL/g, about 0.81 dL/g, about 0.82 dL/g, about 0.83 dL/g, about 0.84 dL/g, about 0.85 dL/g, about 0.86 dL/g, about 0.87 dL/g, about 0.88 dL/g, about 0.89 dL/g, about 0.90 dL/g, about 0.91 dL/g, about 0.92 dL/g, about 0.93 dL/g, about 0.94 dL/g, about 0.95 dL/g, about 0.96 dL/g, about 0.97 dL/g, about 0.98 dL/g, about 0.99 dL/g, about 1.0 dL/g, about 1.05 dL/g, about 1.1 dL/g, about 1.15 dL/g, about 1.2 dL/g, about 1.25 dL/g, about 1.3 dL/g, or about 1.35 dL/g.

The first PET co-polyester resin as described herein can have a zero-shear viscosity from about 20 p (poise) to about 1,000 p when measured at a temperature of 265° C. Alternatively, the first PET co-polyester resins can have an zero-shear viscosity from about 80 p to about 830 p; alternatively, from about 130 p to about 610 p; and alternatively still, from about 200 p to about 435 p. In another aspect, the first PET co-polyester resins incorporating the diacid and/or diol co-monomers in the mole percentages disclosed herein can have an zero-shear viscosity of about 80 p, about 90 p, about 100 p, about 110 p, about 120 p, about 130 p, about 140 p, about 150 p, about 160 p, about 170 p, about 180 p, about 190 p, about 200 p, about 210 p, about 220 p, about 230 p, about 240 p, about 250 p, about 260 p, about 270 p, about 280 p, about 290 p, about 300 p, about 310 p, about 320 p, about 330 p, about 340 p, about 350 p, about 360 p, about 370 p, about 380 p, about 390 p, about 400 p, about 410 p, about 420 p, about 430 p, about 440 p, about 450 p, about 475 p, about 500 p, about 525 p, about 550 p, about 575 p, about 600 p, about 650 p, about 700 p, about 750 p, about 800 p, about 850 p, about 900 p, about 950 p, or about 1,000 p.

Useful amounts of diacid and/or diol co-monomers are typically expressed in the mole (mol) percentages, and the diacid and/or diol co-monomers can be used in the first PET-based co-polyester resin according to this disclosure in any amount, and the amounts will generally vary depending on the specific co-monomer or co-monomers to be incorporated. For example, the first PET-based co-polyester resin can comprise greater than 0 mol % and up to about 20 mol % combined total of a diacid co-monomer and/or a diol co-monomer, based on the total co-monomer or co-monomers content in the first resin. That is, at least one co-monomer is present, but if desired, the first PET-based co-polyester resin can comprise either 0% diacid co-monomer or 0% diol co-monomer.

For example, the total diacid and/or diol co-monomers that can be incorporated into the first PET-based co-polyester resin in ranges of about: from 0.01 to 15 mol %; alternatively from 0.1 to 10 mol %; alternatively, from 0.5 to 5 mol %; alternatively, from 0.01 to 1 mol %; or alternatively, from about 2 to 5 mol % of the total co-monomer content. According to another aspect, the diacid and/or diol co-monomers can be incorporated into the first resin in mole percentages of about 0.01 mol %, 0.02 mol %, 0.05 mol %, 0.1 mol %, 0.2 mol %, 0.5 mol %, 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, or 20 mol % of the total co-monomer content. The diacid and/or diol co-monomer also may be incorporated into the first resin in ranges between any of these specific recited mole percentages (for example, from about 0.01 mol % to about 14.5 mole %), or alternatively still, may be present at less than, or less and equal to, any of these specific recited mole percentages (for example, less than about 20 mol % or less than about 10 mol %).

Non-limiting examples of suitable co-monomers includes dietheylene glycol (DEG), isophthalic acid (IPA), 1,4-Cyclohexanedimethanol (CHDM), dimethyl-2,6-naphthalenedicarboxylate (NDC), and trietheylene gylcol. In one embodiment, the one or more first co-monomers comprises DEG incorporated into the first resin at a mol % from about 0.10 to about 8.0. In another embodiment, the one or more first co-monomers comprises diethylene glycol (DEG) incorporated into the first resin at a mol % from about 0.10 to about 8.0 and one or more other co-monomers incorporated into the first at a mol % from about 0.01 to 6.50.

The syrup dispensing cups described herein have an oxygen transmission rate (OTR) that minimizes the transfer of oxygen gas through and into the body structure. Minimizing the OTR beneficially increases the shelf-life of the contents disposed within the syrup dispensing cups. The OTR is the steady state rate at which oxygen gas permeates through a particular material at specified conditions of temperature and zero relative humidity, and can be determined using ASTM D3985.

The syrup dispensing cup can have an OTR of less than about $6.0 \times 10^{-3}$ cm$^3$/pkg·day at about 23° C. and 50% relative humidity. Alternatively, the syrup dispensing cup can have an OTR from about $1.0 \times 10^{-3}$ cm$^3$/pkg·day to about $10.0 \times 10^{-3}$ cm$^3$/pkg·day; alternatively, from about $1.0 \times 10^{-3}$ cm$^3$/pkg·day to about $5.0 \times 10^{-3}$ cm$^3$/pkg·day; alternatively still, from about $1.0 \times 10^{-3}$ cm$^3$/pkg·day to about $3.5 \times 10^{-3}$ cm$^3$/pkg·day. In another aspect, the syrup dispensing cup can have an OTR from about $2.0 \times 10^{-3}$ cm$^3$/pkg·day to about $3.3 \times 10^{-3}$ cm$^3$/pkg·day. In yet another aspect, the syrup dispensing cup can have an OTR of about $3.3 \times 10^{-3}$ cm$^3$/pkg·day. According to another aspect, the syrup dispensing cup can have an OTR of about $0.5 \times 10^{-3}$ cm$^3$/pkg·day, $1.0 \times 10^{-3}$ cm$^3$/pkg·day, $1.5 \times 10^{-3}$ cm$^3$/pkg·day. $2.0 \times 10^{-3}$ cm$^3$/pkg·day, $2.5 \times 10^{-3}$ cm$^3$/pkg·day, $3.0 \times 10^{-3}$ cm$^3$/pkg·day, $3.5 \times 10^{-3}$ cm$^3$/pkg·day, $4.0 \times 10^{-3}$ cm$^3$/pkg·day, $4.5 \times 10^{-3}$ cm$^3$/pkg·day, $5.0 \times 10^{-3}$ cm$^3$/pkg·day, $5.5 \times 10^{-3}$ cm$^3$/pkg·day, $6.0 \times 10^{-3}$ cm$^3$/pkg·day, $6.5 \times 10^{-3}$ cm$^3$/pkg·day, $7.0 \times 10^{-3}$ cm$^3$/pkg·day, $7.5 \times 10^{-3}$ cm$^3$/pkg·day, $8.0 \times 10^{-3}$ cm$^3$/pkg·day, $8.5 \times 10^{-3}$ cm$^3$/pkg·day, $9.0 \times 10^{-3}$ cm$^3$/pkg·day, $9.5 \times 10^{-3}$ cm$^3$/pkg·day, or $10.0 \times 10^{-3}$ cm$^3$/pkg·day.

The syrup dispensing cup can have an OTR of less than about $22.8 \times 10^{-5}$ cm$^3$/mL·day at about 23° C. and 50% relative humidity. Alternatively, the syrup dispensing cup can have an OTR from about $2.27 \times 10^{-5}$ cm$^3$/mL day to about $22.8 \times 10^{-5}$ cm$^3$/mL·day; alternatively, from about $2.27 \times 10^{-5}$ cm$^3$/mL·day to $11.4 \times 10^{-5}$ cm$^3$/mL·day; alternatively still, from about $2.27 \times 10^{-5}$ cm$^3$/mL day to about $8.0 \times 10^{-5}$ cm$^3$/mL day. In another aspect, the syrup dispensing cup can have an OTR of about $7.5 \times 10^{-5}$ cm$^3$/mL day. In yet another aspect, the syrup dispensing cup can have an OTR of about $0.5 \times 10^{-5}$ cm$^3$/mL·day, $1.0 \times 10^{-5}$ cm$^3$/mL·day, $1.5 \times 10^{-5}$ cm$^3$/mL·day, $2.0 \times 10^{-5}$ cm$^3$/mL day, $2.5 \times 10^{-5}$ cm$^3$/mL·day, $3.0 \times 10^{-5}$ cm$^3$/mL·day, $3.5 \times 10^{-5}$ cm$^3$/mL·day, $4.0 \times 10^{-5}$ cm$^3$/mL day, $4.5 \times 10^{-5}$ cm$^3$/mL day, $5.0 \times 10^{-5}$ cm$^3$/mL day, $5.5 \times 10^{-5}$ cm$^3$/mL day, $6.0 \times 10^{-5}$ cm$^3$/mL·day, $6.5 \times 10^{-5}$ cm$^3$/mL·day, $7.0 \times 10^{-5}$ cm$^3$/mL·day, $7.5 \times 10^{-5}$ cm$^3$/mL·day, $8.0 \times 10^{-5}$ cm$^3$/mL·day, $8.5 \times 10^{-5}$ cm$^3$/mL·day, $9.0 \times 10^{-5}$ cm$^3$/mL·day, $10.0 \times 10^{-5}$ cm$^3$/mL·day, $10.5 \times 10^{-5}$ cm$^3$/mL·day, $11.0 \times 10^{-5}$ cm$^3$/mL·day, $11.5 \times 10^{-5}$ cm$^3$/mL·day, $12.0 \times 10^{-5}$ cm$^3$/mL·day, $12.5 \times 10^{-5}$ cm$^3$/mL·day, $13.0 \times 10^{-5}$ cm$^3$/mL·day, $13.5 \times 10^{-5}$ cm$^3$/mL·day, $14.0 \times 10^{-5}$ cm$^3$/mL·day, $14.5 \times 10^{-5}$ cm$^3$/mL·day, $15.0 \times 10^{-5}$ cm$^3$/mL·day, $15.5 \times 10^{-5}$ cm$^3$/mL·day, $16.0 \times 10^{-5}$ cm$^3$/mL·day, $16.5 \times 10^{-5}$ cm$^3$/mL·day, $17.0 \times 10^{-5}$ cm$^3$/mL·day, $17.5 \times 10^{-5}$ cm$^3$/mL·day, $18.0 \times 10^{-5}$ cm$^3$/mL·day, $12.5 \times 10^{-5}$ cm$^3$/mL·day, $18.5 \times 10^{-5}$ cm$^3$/mL·day, $19.0 \times 10^{-5}$ cm$^3$/mL·day, $19.5 \times 10^{-5}$ cm$^3$/mL·day, $20.0 \times 10^{-5}$ cm$^3$/mL·day, $20.5 \times 10^{-5}$ cm$^3$/mL·day, $21.0 \times 10^{-5}$ cm$^3$/mL·day, $21.5 \times 10^{-5}$ cm$^3$/mL·day, $22.0 \times 10^{-5}$ cm$^3$/mL, $22.5 \times 10^{-5}$ cm$^3$/mL·day, $23.0 \times 10^{-5}$ cm$^3$/mL·day, $23.5 \times 10^{-5}$ cm$^3$/mL day, $24.0 \times 10^{-5}$ cm$^3$/mL day, $24.5 \times 10^{-5}$ cm$^3$/mL day, or $25.0 \times 10^{-5}$ cm$^3$/mL day.

The syrup dispensing cups described herein have a water vapor transmission rate (WVTR) that reduces or minimizes the transfer of moisture through and into the body structure. Reducing and/or minimizing the WVTR beneficially increases the shelf-life of the contents disposed within the syrup dispensing cups. The WVTR is the steady state rate at which water vapor permeates through a particular material at specified conditions of temperature and relative humidity. The WVTR can be determined using the information in the following table.

TABLE 1

| Basis for WVTR calculations | | | | | |
|---|---|---|---|---|---|
| Water Vapor Permeability (g · mm/m$^2$ · d) | 0.71 | 37.8° C. and 90% Relative Humidity | | | |
| PET Syrup Cup | External Surface Area (mm$^2$) | Weighted Average Wall Thickness (mm) | Cup WVTR (g/d) | Target Shelf Life (months) | Water Loss at End of Shelf Life (g) |
| 1.0 mm Cup | 5,578 | 1.12 | 0.00354 | 6.00 | 0.645 |
| 0.6 mm Cup | 5,323 | 0.68 | 0.00556 | 6.00 | 1.014 |

Source: Plastics Design Library, *Permeability Properties of Plastics and Elastomers, A Guide to Packaging and Barrier Materials, Second Edition*, p. 191 (2003).

In one aspect, the syrup dispensing cup can have a WVTR of less than about $4.0 \times 10^{-3}$ g/m$^2$/day. Alternatively, the syrup dispensing cup can have an WVTR from about $3.9 \times 10^{-3}$ g/m$^2$/day to about $9.3 \times 10^{-3}$ g/m$^2$/day; alternatively, from about $4.3 \times 10^{-3}$ g/m$^2$/day to about $7.5 \times 10^{-3}$ g/m²/day; alternatively still, from about $4.8 \times 10^{-3}$ g/m²/day to about $6.3 \times 10^{-3}$ g/m²/day. According to another aspect, the syrup dispensing cup can have an WVTR of about $0.5 \times 10^{-3}$ g/m²/day, $1.0 \times 10^{-3}$ g/m²/day, $1.5 \times 10^{-3}$ g/m²/day, $2.0 \times 10^{-3}$ g/m²/day, $2.5 \times 10^{-3}$ g/m²/day, $3.0 \times 10^{-3}$ g/m²/day, $3.5 \times 10^{-3}$ g/m²/day, $4.0 \times 10^{-3}$ g/m²/day, $4.5 \times 10^{-3}$ g/m²/day, $5.0 \times 10^{-3}$ g/m²/day, $5.5 \times 10^{-3}$ g/m²/day, $6.0 \times 10^{-3}$ g/m²/day, $6.5 \times 10^{-3}$ g/m²/day, $7.0 \times 10^{-3}$ g/m²/day, $7.5 \times 10^{-3}$ g/m²/day, $8.0 \times 10^{-3}$ g/m²/day, $8.5 \times 10^{-3}$ g/m²/day, $9.0 \times 10^{-3}$ g/m²/day, or $9.5 \times 10^{-3}$ g/m²/day. In some aspects, the first PET co-polyester resins can also include one or more additives. Non-limiting examples of suitable additives include oxygen scavengers, nucleation agents, mold release agents (e.g., SUKANO POLYMERS addition level, 0.001 wt % to 1.000 wt % in final resin blend), color enhancing agents (e.g., liquid or solid, used in Sukano Polymers Tob s354-NT blue toner enhancer, addition level 0.30 wt % to 1.000 wt %), pigments, and impact modifiers, and combinations thereof.

In one aspect, the first PET-based co-polyester resin may include one or more nucleation agents. In instances where the body structure is fabricated via injection molding, the addition of one or more nucleation agents may, among other things, beneficially reduce the cycle times. This is because the nucleation agents provide a surface on which crystal can start, thereby resulting in increased crystal formation, particularly in small crystal domains. Also, the additional of one or more nucleation agents may advantageously increase the durability of the syrup dispensing cup, e.g., with respect to stiffness (flexural modulus) and impact resistance.

Non-limiting examples of suitable nucleation agents include ADEKA Amfine NA-05, Sukano Polymers TH-03-12 MB05LP, and combinations thereof. In one instance, the first PET-based co-polyester resin may include one or more nucleation agents present at a concentration from about 0.01 ppm to about 1,000 ppm, alternatively from about 100 ppm to about 750 ppm, or alternatively from about 100 ppm to about 500 ppm. In another instance, the first PET-based co-polyester resin may not include one or more nucleation agents.

In another aspect, the first PET-based co-polyester resin may include one or more oxygen scavengers. The addition of one or more oxygen scavengers may beneficially decrease the OTR of the syrup dispensing cup, thereby increasing shelf-life thereof. In one instance, the one or more oxygen scavengers are present at a concentration from about 0.01% to about 10% by weight of the first PET-based co-polyester resin. In another instance, the one or more oxygen scavengers are present at a concentration of about 2.5% or less by weight of the first PET-based co-polyester resin. A suitable concentration of the one or more oxygen scavengers depends at least in part on the average thickness of the body structure. In another instance, the first PET-based co-polyester resin may not include one or more oxygen scavengers.

Non-limiting examples of suitable oxygen scavengers include A110ac, SolO2, Monoblox+, CESA Absorb, Oxyclear, Polyprotect JB, Diamond Clear C93, Diamond Clear 992, Diamond Clear 300, HyGuard, and combinations thereof.

In certain aspects, the first PET-based co-polyester resin may include one or more nucleation agents at a concentration from about 0.01 ppm to about 1,000 ppm and one or more oxygen scavengers at a concentration from about 0.01% to about 10% by weight of the first resin.

Sealing Layers

Heat sealability and gas/permeate barrier properties can be competing packaging design attributes, since both may be strongly, but inversely affected by the extent and size distribution of the crystalline phase and the mobility of the amorphous phase (glass transition temperature). To achieve enhanced heat sealability, co-monomer modification of a polymeric resin may be employed to reduce the average crystallizable chain sequence lengths and slow crystallization kinetics, leading to a decrease in the extent of crystallinity, as well as a lower glass transition temperature to increase chain mobility for the interfacial interdiffusion that occurs in order to enable the creation of an effective heat seal. However, the permeation of gas and flavor components (scalping) into the polymer, generally increases with the square of the amorphous phase volume fraction, and with a reduction in the glass transition temperature.

To improve the shelf-life of the contents, low oxygen transmission is desirable, and thus higher crystallinity with a dispersed, nucleated crystalline phase may be desirable to yield a more tortuous gas diffusion path. To achieve a desirable balance between heat sealability and barrier properties of the syrup dispensing cups, suitable co-monomer systems (type and composition) should be chosen for the second PET-based co-polyester resin.

Without being bound to a single theory, the first PET-based co-polyester resin can be modified by co-monomer insertion during polymerization to a substantially lesser extent than the second PET-based co-polyester resin.

The first opening and the second opening of the body structure are sealed with a first sealing layer and a second sealing layer, respectively. In one aspect, the first and second sealing layers may be prepared from the PET-based co-polyester resins and by the processes, in full or in part, as described in U.S. Pat. No. 6,663,997 (the '997 patent), which is incorporated herein by reference. Applicants hereby incorporate all co-polyesters of the '997 patent by reference.

The first and second sealing layers can include one or more second co-monomers incorporated into the second resin at a second mol %, in which the ratio of the first mol % to the second mol % can be less than 1. For example, in various instances, the ratio of the first mol % to the second mol % can be from about 0.01 to about 0.95; alternatively from about 0.05 to about 0.5; alternatively still from about 0.1 to about 0.4. In another instance, the ratio of the first mol % to the second mol % is about 0.3.

As compared with the first PET-based co-polyester resin of the body structure, the second PET-based co-polyester resin can have an intrinsic viscosity (I.V.) that is greater than, less than, or the same as the I.V. in the first PET-based co-polyester resin. For example, in some instances and embodiments, the second PET co-polyester resins as described herein can have an intrinsic viscosity from about 0.50 dL/g to about 1.0 dL/g when measured at a temperature of ° 25° C.

Useful amounts of diacid and/or diol co-monomers are typically expressed in the mole (mol) percentages, and the diacid and/or diol co-monomers can be used in the second PET-based co-polyester resin according to this disclosure in any amount, and the amounts will generally vary depending on the specific co-monomer or co-monomers to be incorporated. For example, the second PET-based co-polyester resin can comprise greater than 0 mol % and up to about 30 mol % combined total of a diacid co-monomer and/or a diol co-monomer, based on the total co-monomer or co-monomers content in the second resin. That is, at least one co-monomer is present, but if desired, the second PET-based co-polyester resin can comprise either 0% diacid co-monomer or 0% diol co-monomer.

For example, the total diacid and/or diol co-monomers that can be incorporated into the second PET-based co-polyester resin in ranges of about: from 0 to 30%. Non-limiting examples of suitable co-monomers includes dietheylene glycol (DEG), isophthalic acid (IPA), 1,4-Cyclohexanedimethanol (CHDM), dimethyl-2,6-naphthalenedicarboxylate (NDC), and trietheylene gylcol.

In some instances or embodiments, as compared with the one or more first co-monomers, the second one or more second co-monomers may comprise DEG incorporated into the second resin at the same or a different mol % than is incorporated into the second resin. That is, the second one or more second co-monomers may comprise DEG incorporated into the second resin at a mol % greater than, less than, or the same as the first resin. For example, in some instances or embodiments, for example, the one or more second co-monomers comprise DEG incorporated into the second resin at from about 0.10 mol % to about 20.0 mol %.

As compared with the first PET-based co-polyester resin, the second PET co-polyester resin can have a zero-shear viscosity that is the same or different from that of the first PET-based co-polyester resin. That is, the second PET co-polyester resin can have a zero-shear viscosity that is greater than, less than, or the same as that of the first PET co-polyester resin. In some instances or embodiments, the second PET-based co-polyester resin has a zero-shear viscosity from about 20 p to about 500 p when measured at a temperature of 265° C.

The second PET-based co-polyester resin can have a peak melting temperature from about 160° C. to about 275° C. Alternatively, the second PET co-polyester resin can have a peak melting temperature from about 170° C. to about 264° C.; alternatively from about 165° C. to 270° C.; alternatively from about 170° C. to about 255° C.

As with the first PET co-polyester resin, in some instances, the second PET co-polyester resin can also include one or more additives. Non-limiting examples of suitable additives include oxygen scavengers, nucleation agents, and combinations thereof.

Lid Structures

Figure 2:
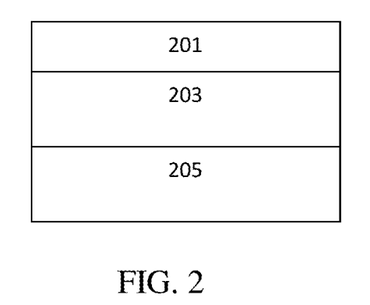
FIG. 2 illustrates a cross-sectional view of a lid structure in accordance with an embodiment of the present disclosure.

According to a further aspect, the syrup dispensing cup 100 can also include a first lid structure 111 and/or a second lid structure 113. In one instance, the first and/or second lid structures 111, 113 can include the respective sealing layer and one or more layers or coatings. For example, in one instance, as illustrated in FIG. 2, the first lid structure may include the first sealing layer 205, an oriented PET-based layer 201, and an inorganic coating 203, with the inorganic coating 203 located between the sealing layer 205 and the oriented PET-based layer 201. In another instance, the second lid structure 113 may include the second sealing layer 205, an oriented PET-based layer 201, and an inorganic coating 203, with the inorganic coating 203 located between the sealing layer 205 and the oriented PET-based layer 201. In yet another instance, the first lid structure 111 and the second lid structure 113 each include the first and second sealing layers, respectively, an oriented PET-based layer, and an inorganic coating located between the respective sealing layer and the oriented PET-based layer.

Non-limiting examples of suitable inorganic barrier coatings includes aluminum oxide, vapor deposited metalized coatings, silicon dioxide, amorphous carbon, molecular self-assembled layers comprising barrier polymers, EVOH/polybutyed coatings, e.g. Eniroclear® liquid coatings, and combinations thereof.

Figure 3:
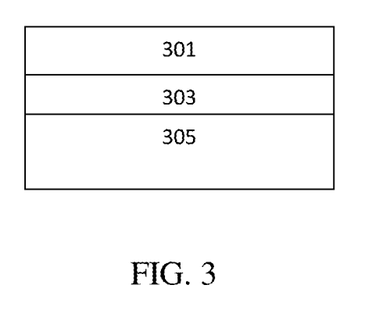
FIG. 3 illustrates a cross-sectional view of a lid structure in accordance with another embodiment of the present disclosure.

In certain instances, the syrup dispensing cup 100 can further include a first lid structure 111, for example, as illustrated in FIG. 3, that includes the first sealing layer 305, a foil layer 301, and an adhesive 303, in which the adhesive 303 is located between the first sealing layer 305 and foil layer. The syrup dispensing cup 100 may, alternatively or in addition to the first lid structure 111, include a second lid structure 113 that includes the second sealing layer 305, a foil layer 301, and an adhesive 303, in which the adhesive 303 is located between the second sealing layer 305 and foil layer.

EXAMPLES

Cup injection molding experiments involving three PET-based co-polyester resins were performed at Omega Plastics in Clinton Twp, Mich. These resins were Indorama 3301, Indorama 7804, and Eastman Eastar® EN067. The technical descriptions of these resins are as follows:

Indorama 3301: Designated by Indorama (Auriga Polymers, Inc.) as Polyclear® Splash PET for use in clear water bottle production. Indorama 3301 has a nominal intrinsic viscosity of 0.74 dL/g, and a DSC peak melting point of 242° C. Indorama 3301 is an IPA-modified PET copolyester with DEG at 3.1 mol % and IPA at 3.0 mol %. Resin intrinsic viscosity was measured to be 0.725 dL/g.

Indorama 7804: Designated by Indorama (Auriga Polymers, Inc.) as 0.75 dl/g IV development grade copolyester, the resin contains an unknown nucleating package to accelerate crystallization rate. DSC scans provided by Auriga Polymers, Inc. confirm the peak melting temperature to be 249° C. DEG content was 1.1 mol % and the resin intrinsic viscosity was measured to be 0.725 dL/g.

Eastman Eastar® EN067: A clear, nominal 0.60 dL/g IV specialty grade PET resin from Eastman Chemical that has a peak melting temperature of 242° C. This resin is PET copolyester resin comprising 1.4 mol % DEG and 4.3 mol % CHDM.

Resin Analytical Characterization

Internal analytical characterizations of the three resin were determined with respect to resin melt rheology, DSC thermal characteristics, and co-monomer compositions. The table below summarizes the results of each tested resin.

TABLE 2

Measured Characteristics of the PET co-polyester resins

| Resin Property | Indorama 3301 | Indorama 7804 | Eastman Eastar® EN067 |
|---|---|---|---|
| Zero-Shear Viscosity $\eta_0$ (Pa · s at 265° C.)[1] | 644.3 | 780.2 | 302.1 |
| Flow Activation Energy $E_A$ (kJ/mol)[1] | 66.6 | 77.2 | 66.1 |
| Carreau-Yasuda Relaxation Time (s)[1] | $3.452 \times 10^{-3}$ | $1.550 \times 10^{-3}$ | $1.714 \times 10^{-3}$ |
| Carreau-Yasuda Rate Exponent[1] | 0.9211 | 0.7901 | 0.9931 |
| Power Law Exponent[1] | 0.4697 | 0.1637 | 0.4668 |
| DSC Peak Melting Temperature (° C.)[2] | 241.6 | 253.5 | 241.9 |
| Recrystallization Peak on Second Heat Scan | Yes | No | Yes |
| DEG Content (mol %)[3] | 3.0 | 1.1 | 2.4 |
| Comonomer[3] | IPA | None Detected | CHDM |

TABLE 2-continued

Measured Characteristics of the PET co-polyester resins

| Resin Property | Indorama 3301 | Indorama 7804 | Eastman Eastar® EN067 |
|---|---|---|---|
| Comonomer Content (mol %)[3] | 3.1 | 1.1 | 4.3 |
| Number-Average Molecular Weight (Da)[4] | 24,900 | 25,200 | 19,700 |
| Weight-Average Molecular Weight (Da)[4] | 56,200 | 58,000 | 44,800 |
| Polydispersity Index[5] | 2.25 | 2.30 | 2.28 |
| Nucleating Agent Added | No | Yes | No |

[1]Dynamic shear rheology was calculated using a TA Instruments ARES strain-controlled melt rheometer using a dynamic strain of 3% over the angular frequency range of 0.3 to 500 rad/s at 245, 255, and 265° C. The three isothermal frequency sweeps were reduced to a flow master-curve referenced to 265° C. using horizontal time-temperature superposition. The zero-shear viscosity was determined from fitting the master curve to the Carreau-Yasuda constitutive model:

$$\eta(T, \dot{\gamma}) = \frac{a_T \eta_0(T_r)}{[1 + \{a_T \lambda_1(T_r)\}^{a_1}]^{\frac{1-n}{a_1}}}$$

where $a_T$ is the Arrhenius-based time-temperature superposition shift factor based upon the flow Activation energy, $E_A$, the gas constant R, reference temperature, $T_r$:

$$\alpha_T = \exp\left[\frac{E_A}{R}\left(\frac{1}{T} - \frac{1}{T_r}\right)\right]$$

[2]Peak melting temperatures and enthalpies were determined from the second heat melting scan at 10° C./min, following a cooling crystallization scan performed from 300° C. at 10° C./min.
[3]Co-monomer compositions were determined by base hydrolysis (saponification) of polyethylene terephthalate (PET) followed by derivatization (silylation) of the alcohols, glycols, and acids. Agilent Technologies 6890 gas chromatograph with 5973 mass selective detector (GC/MS) was used for detection and quantitation of the silylated comonomers. The silyl ethers and esters were separated using a 30 m × 0.25 mm ID (5%-phenyl)-methylpolysiloxane coated fused-silica capillary column with a film thickness of 0.25 μm. The GC oven was programmed to start at 50☐ C. and hold for 2 mm and ramp at 10☐ C./min to a final temperature of 310☐ C. and hold for 2 mm. The helium carrier gas flow rate was set to 1 mL/min. The system was calibrated using combined comonomer (diethylene gycol, isophthalic acid, cyclohexanedimethanol) standard solutions at five levels to bracket sample concentrations with correlation coefficient (R2) greater than 0.995. Data processing was performed using Agilent Technologies Chemstation software to determine.
[4]Resin molecular weights/distributions were determined as follows: 4A monodispersed polystyrene (PS) standard of known molecular weight (Mw 51.5K) and polydispersity (1.03) was used for normalizing and calibrating the laser light scattering detector. Polydispersed polyethylene terephthalate (PET) standards of known molecular weight and polydispersity were used for back calculating the dn/dc (the change in refractive index over the change in concentration) value for PET in the solvent system. The PET standards (Mw 50K and 75K) were selected that have a similar molecular weight distribution to that of the PET samples. Standards and samples were prepared by dissolving in 1,1,1,3,3,3-hexafluoroisopropanol (HFIP). Then diluted with chloroform (CHCl3) to reach a final concentration of 2 mg/mL in CHCl3/HFIP (98:2 v/v). The polymer solutions were filtered (PTFE, 0.45 μm). Standards and samples were injected into the following system: Waters alliance GPCV 2000 coupled with a Waters 2489 UV/Visible Detector system (270 nm) and Precision Detectors PD2040 Laser Light Scattering Detector (685 nm). Molecular weight distribution was measured using two 10 μm polystyrene/divinylbenzene (PS/DVB) PLgel MIXED-B LS columns (7.5 mm ID × 300 mm) and one 10 μm PS/DVB PLgel Guard Column (7.5 mm ID × 50 mm) at 35☐ C. with a flow rate of 1 mL/min in CHCl3/HFIP (98:2 v/v). Data processing was performed using Waters Empower Pro software to determine number-average molecular weight (Mn) and weight-average molecular weight (Mw).
[5]Polydispersity Index was determined using the following equation:

$$PDI = \frac{M_w}{M_n}$$

Injection Molding Testing and Results

Indorama 3301, Indorama 7804, and Eastman Eastar® EN067 were each injected molded into the body structure of an exemplary syrup dispensing cup with the following dimensional characteristics detailed in the following table.

TABLE 3

Dimensional Characteristics of Syrup Dispensing Cup

| Parameter | Value | Unit(s) |
|---|---|---|
| Maximum product volume (under sealed lidding) | 44 | cm[3] |
| Cup internal surface area (to lidding sealing surface) | 55 | cm[2] |
| Cup internal surface area (including internal lidding surface) | 78 | cm[2] |
| Total internal area (open cup) | 69 | cm[2] |
| Total external surface area | 92 | cm[2] |
| Average wall thickness | 0.02-0.5 | cm |

Injection molding was performed using a single-cavity cup mold installed on a Milacron FANUC Roboshot® S 2000i 55B injection molding machine with a cold runner. The press tonnage was 55 tons, and the 20:1 L/D general purpose (CPM 9V linear taper) single screw was driven by a 6.7 hp motor. Barrel temperature for the extruder was controlled over four zones and the gate.

Indorama 3301: A 2×2 experiment design with replicated center points was employed to investigate the effect of mold temperature and cooling time on crystallization kinetics and crystalline development in the molded part. The resin was dried to 0.008 wt. % moisture prior to the run. The melt temperature was controlled at 526° F. Cooling times were varied at 1.25 s (low) and 5.25 s (high) with a midpoint of 3.25 s. Mold set point temperatures were 90° F. (low) and 120° F. (high), with a midpoint of 105° F. Six trial items were run according to the test matrix outlined in the following Table.

TABLE 4

Injection molding for Indorama 3301 DOE run sequence

| Injection Molding Process Variable | Run | | | | | |
| | 1 | 2 | 3 | 4 | 5 | 6 |
|---|---|---|---|---|---|---|
| Starting Resin Intrinsic Viscosity (dL/g) | 0.725 | 0.725 | 0.725 | 0.725 | 0.725 | 0.725 |
| Extruder Zone 1 Temperature (° F.) | 130 | 130 | 130 | 130 | 130 | 130 |
| Extruder Zone 2 Temperature (° F.) | 495 | 495 | 495 | 495 | 495 | 495 |
| Extruder Zone 3 Temperature (° F.) | 510 | 510 | 510 | 510 | 510 | 510 |
| Extruder Zone 4 Temperature (° F.) | 520 | 520 | 520 | 520 | 520 | 520 |
| Extruder Nozzle Temperature (° F.) | 560 | 560 | 560 | 560 | 560 | 560 |
| Injection Melt Temperature (° F.) | 520 | 520 | 520 | 520 | 520 | 520 |
| Injection Pressure (psig) | 37,681 | 38,732 | 37,681 | 36,961 | 36,286 | 36,734 |
| Mold Temperature (° F.) | 90 | 105 | 120 | 90 | 120 | 105 |
| Cycle Time (s) | 16.28 | 16.25 | 16.28 | 17.32 | 17.32 | 17.14 |
| Recovery Time (s) | 0.99 | 0.97 | 0.99 | 0.96 | 0.96 | 0.96 |
| Fill Time (s) | 0.346 | 0.346 | 0.346 | 0.346 | 0.346 | 0.346 |
| Cool Time (s) | 1.25 | 3.25 | 1.25 | 5.25 | 5.25 | 3.25 |
| Cup Resin Intrinsic Viscosity (dL/g) | 0.717 | 0.712 | 0.704 | 0.691 | 0.693 | 0.694 |
| Resin to Cup IV Drop (dL/g) | 0.008 | 0.013 | 0.021 | 0.034 | 0.032 | 0.031 |

Indorama 7804: A DOE run similar to the DOE run for Indorama 3301 could not be performed for Indorama 7804 because Indorama 7804 crystallized rapidly during the initial midpoint run conditions. DSC results confirmed the fast crystallization rates of Indorama 7804, as attempted isothermal crystallization half-time experiments in the temperature range from 140-200° C. could not be run as crystallization completed before a steady isothermal condition could be reached. As a result, one run for Indorama 7804 was performed at one set of conditions, as detailed in Table 4, that appeared to optimize the injection molding performance. It was discovered during the injection molding run that the male mold half temperature control would not permit cooling below 135° F. This process limitation led to increased part crystallinity, especially at the gate. It should be noted that ejection was difficult as part stuck to male mold half. Temperature measurements of male mold half indicated 135° C. whereas the mold set point temperature was 120° C. An attempt was made to switch core cooling to a different cooling system to balance the core with the rest of the mold. Cooling was inadequate to zero the temperature difference between the male core and the mold.

TABLE 5

Injection molding conditions for Indorama 7804

| Injection Molding Process Variable | Run 1 |
|---|---|
| Starting Resin Intrinsic Viscosity (dL/g) | 0.725 |
| Extruder Zone 1 Temperature (° F.) | 130 |
| Extruder Zone 2 Temperature (° F.) | 535 |
| Extruder Zone 3 Temperature (° F.) | 545 |
| Extruder Zone 4 Temperature (° F.) | 545 |
| Extruder Nozzle Temperature (° F.) | 570 |
| Injection Melt Temperature (° F.) | 546 |
| Injection Pressure (psig) | 35,237 |
| Mold Temperature (° F.) | 125 |
| Cycle Time (s) | 14.71 |
| Recovery Time (s) | 1.00 |
| Fill Time (s) | 0.391 |
| Cool Time (s) | 4.25 |
| Resin Cup Intrinsic Viscosity (dL/g) | 0.671 |
| Resin to Cup IV Drop (dL/g) | 0.054 |

Eastman Eastar® EN067: This resin is a medical grade polyester. It is a grade of crystallized thermoplastic polyester in the form of pellets.

TABLE 6

Injection molding conditions for Eastman Eastar® EN067

| Injection Molding Process Variable | Run 1 |
|---|---|
| Starting Resin Intrinsic Viscosity (dL/g) | NR [1] |
| Extruder Zone 1 Temperature (° F.) | 130 |
| Extruder Zone 2 Temperature (° F.) | 537 |
| Extruder Zone 3 Temperature (° F.) | 539 |
| Extruder Zone 4 Temperature (° F.) | 540 |
| Extruder Nozzle Temperature (° F.) | 550 |
| Injection Melt Temperature (° F.) | NR |
| Injection Pressure (psig) | 12,711 |
| Mold Temperature (° F.) | NR |
| Cycle Time (s) | 32.30 |
| Recovery Time (s) | 8.32 |
| Fill Time (s) | 0.295 |

TABLE 6-continued

Injection molding conditions for Eastman Eastar® EN067

| Injection Molding Process Variable | Run 1 |
|---|---|
| Cool Time (s) | 15.00 |
| Resin-Cup Intrinsic Viscosity (dL/g) | NR |

[1] NR: Not recorded.

Melt Rheology and Injection Molding Performance

Figure 4:
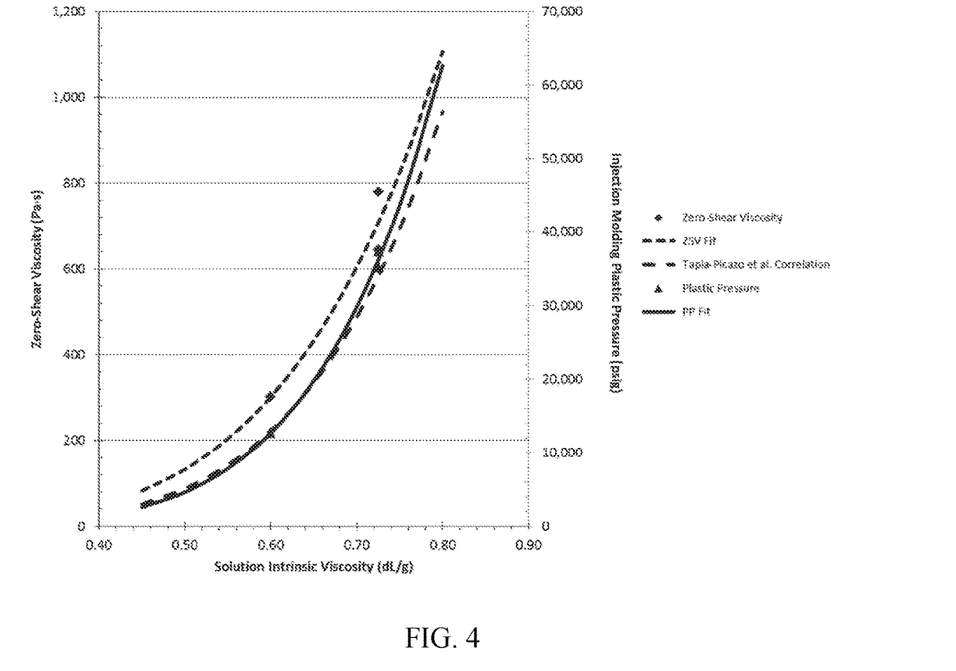
FIG. 4 is a graph depicting injection molding performance as related to resin melt shear rheology.

The zero-shear viscosities at 265° C. and injection molding plastic pressures for the three evaluated resins are shown as a function of the resin intrinsic viscosity in FIG. 4. Eastman Eastar® EN067 had the lowest zero-shear viscosity at 265° C., followed by Indorama 3301, and finally by Indorama 7804. Observed injection molding plastic pressures for the resins were found to rank similarly.

These results indicate that a PET-based co-polyester resin having an intrinsic viscosity between 0.55 dL/g and 0.65 dL/g, preferably targeted at 0.65 dL/g, can yield a plastic pressure of about 20,000 psig at an injection molding temperature of about 526° F. on the Milacron FANUC Roboshot® S 2000i 55B injection molding machine.

Peak Melting Temperatures and Co-Monomer Composition

Using an internal compilation of the DSC peak melting temperatures and compositions of 136 PET homopolymers and co-polymers, model equations were developed relating the co-monomer composition to the resin peak melting temperature. In injection molding, the molding conditions, particularly melt and mold temperatures, have a significant impact on the final properties of the molded material, regardless of the part design.

Figure 5:
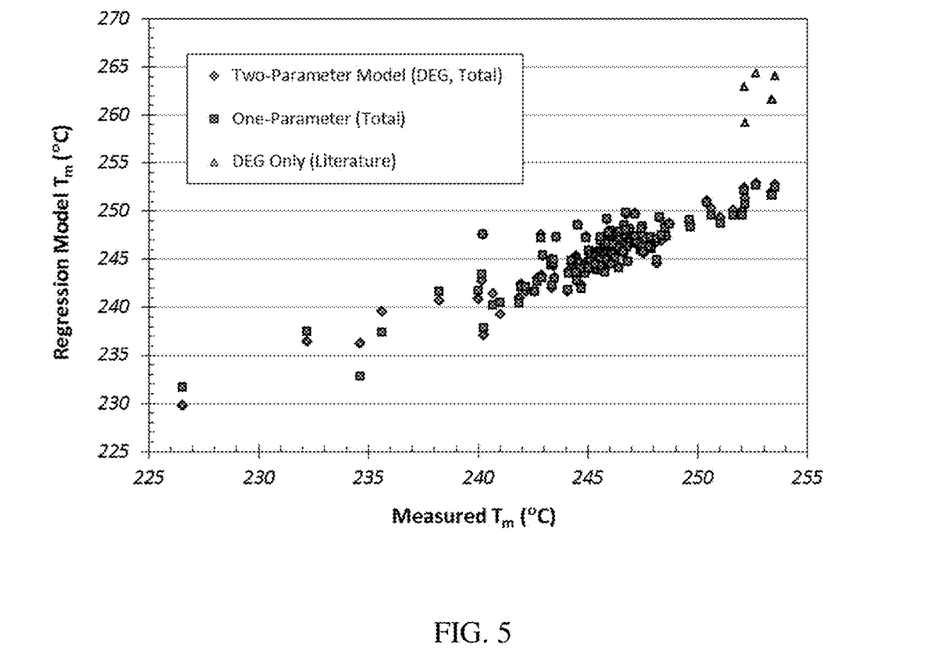
FIG. 5 is a graph depicting measured and model calculated peak melting temperature for 136 PET homopolymer and co-polyester resins.

The first linear regression model related the copolyester peak melting temperature to the diethylene glycol (DEG) content and the collective content of the other monomers. The second linear regression model considered related the copolyester peak melting temperature to the total co-monomer content, which includes DEG. The parity plots for these model equations are shown in FIG. 5 with the corresponding regression equations (Equation 4 and Equation 5) as follows:

$$T_m(° C.)=254.7-1.730(\text{mol \% DEG})-2.588(\text{mol \% other co-monomers}) \quad (4)$$

$$R^2=0.8005$$

$$T_m(° C.)=255.2-2.240(\text{mol \% total co-monomers}) \quad (5)$$

$$R^2=0.7797$$

As illustrated in FIG. 5, the results of the regression analysis indicated that only an additional 2% of the variation in the peak melting temperature data can be attributed to differentiating diethylene glycol (DEG) from other copolyester co-monomers. Both models indicate substantially similar values for the peak melting temperature of the homopolymer PET, i.e. about 255° C. in both cases.

The disclosures of various publications may be referenced throughout this specification, which are hereby incorporated by reference in pertinent part in order to more fully describe the state of the art to which the disclosed subject matter pertains. To the extent that any definition or usage provided by any document incorporated herein by reference conflicts with the definition or usage provided herein, the definition or usage provided herein controls.

Throughout the specification and claims, the word "comprise" and variations of the word, such as "comprising" and "comprises," means "including but not limited to," and is not intended to exclude, for example, other additives, components, elements, or steps. While methods and features are described in terms of "comprising" various steps or components, these methods and features can also "consist essentially of" or "consist of" the various steps or components.

Unless indicated otherwise, when a range of any type is disclosed or claimed, for example a range of the percentages, WDEs, diameters, weights, and the like, it is intended to disclose or claim individually each possible number that such a range could reasonably encompass, including any sub-ranges or combinations of sub-ranges encompassed therein. When describing a range of measurements such as these, every possible number that such a range could reasonably encompass can, for example, refer to values within the range with one significant figure more than is present in the end points of a range, or refer to values within the range with the same number of significant figures as the end point with the most significant figures, as the context indicates or permits. For example, when describing a range of percentages such as from 85% to 95%, it is understood that this disclosure is intended to encompass each of 85%, 86%, 87%, 88%, 89%, 90%, 91%, 92%, 93%, 94%, and 95%, as well as any ranges, sub-ranges, and combinations of sub-ranges encompassed therein. Applicants' intent is that these two methods of describing the range are interchangeable. Accordingly, Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed herein, and that each value is also herein disclosed as "about" that particular value in addition to the value itself. In aspects, "about" can be used to mean within 10% of the recited value, within 5% of the recited value, or within 2% of the recited value.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that are employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

Those skilled in the art will readily appreciate that many modifications are possible in the exemplary embodiments disclosed herein without materially departing from the novel teachings and advantages according to this disclosure. Accordingly, all such modifications and equivalents are intended to be included within the scope of this disclosure as defined in the following claims. Therefore, it is to be understood that resort can be had to various other aspects, embodiments, modifications, and equivalents thereof which, after reading the description herein, may suggest themselves to one of ordinary skill in the art without departing from the spirit of the present disclosure or the scope of the appended claims.

Applicants reserve the right to proviso out any selection, feature, range, element, or aspect, for example, to limit the scope of any claim to account for a prior disclosure of which Applicants may be unaware.

The following numbered aspects, embodiments, and features of the disclosure are provided, with an emphasis on the ability to combine the various features which may disclosed only in certain embodiments, into other disclosed embodiments, as the context and technical reason allow.

1. A syrup dispensing cup comprising:
   a body structure having a first end with a first opening, a second end with a second opening, a sidewall structure extending between the first end and the second end, and having an interior space, wherein the body structure comprises a first polyester or co-polyester resin comprising one or more first co-monomers incorporated into the first resin at a first mol % and having an intrinsic viscosity from about 0.45 dL/g to about 1.3 dL/g when measured at a temperature of 25° C.,
   wherein the first opening is sealed with a first sealing layer and the second opening is sealed with a second sealing layer, each sealing layer comprising a second PET-based co-polyester resin comprising one or more second co-monomers incorporated into the second resin at a second mol %, and
   wherein the ratio of the first mole % to the second mol % is less than 1.
2. The syrup dispensing cup according to aspect 1, wherein the intrinsic viscosity is from about 0.6 dL/g to about 1.2 dL/g.
3. The syrup dispensing cup according to any of the above aspects, wherein the one or more first co-monomers comprises diethylene glycol (DEG) incorporated into the first resin at a mol % from about 0.10 to about 8.0.
4. The syrup dispensing cup according to any of the above aspects as the context allows, wherein the body structure further comprises one or more oxygen scavengers present at a concentration from about 0.01% to about 10% by weight of the first polyester or co-polyester resin.
5. The syrup dispensing cup according to any of the above aspects as the context allows, wherein the syrup dispensing cup has an oxygen transmission rate of less than about $6.0 \times 10^{-3}$ cm$^3$/pkg·day at about 23° C. and 50% relative humidity.
6. The syrup dispensing cup according to any of the above aspects as the context allows, wherein the syrup dispensing cup has an oxygen transmission rate of less than about $22.8 \times 10^{-5}$ cm$^3$/mL·day at at about 23° C. and 50% relative humidity.
7. The syrup dispensing cup according to any of the above aspects as the context allows, wherein the syrup dispensing cup has a water vapor transmission rate of less than about $4.0 \times 10^{-3}$ g/m$^2$/day at about 37.8° C. and about 90% relative humidity.
8. The syrup dispensing cup according to any of the above aspects as the context allows, wherein the syrup dispensing cup further comprises a first lid structure that comprises the first sealing layer, an oriented PET-based layer, and an inorganic coating, in which the inorganic coating is located between the first sealing layer and oriented PET-based layer.

9. The syrup dispensing cup according to any of the above aspects as the context allows, wherein the syrup dispensing cup further comprises a first lid structure that comprises the first sealing layer, a foil layer, and an adhesive, in which the adhesive is located between the first sealing layer and oriented PET-based layer.

10. The syrup dispensing cup according to any of the above aspects as the context allows, wherein the syrup dispensing cup further comprises a second lid structure that comprises the second sealing layer, an oriented PET-based layer, and an inorganic coating, in which the inorganic coating is located between the second sealing layer and oriented PET-based layer.

11. The syrup dispensing cup according to any of the above aspects as the context allows, wherein the syrup dispensing cup further comprises a second lid structure that comprises the second sealing layer, a foil layer, and an adhesive, in which the adhesive is located between the second sealing layer and oriented PET-based layer.

12. A method for enhancing the shelf-life of a syrup dispensing cup, the method comprising:
a) providing a first polyester or co-polyester resin comprising one or more first co-monomers incorporated into the first resin at a first mol % and having an intrinsic viscosity from about 0.45 dL/g to about 1.3 dL/g when measured at a temperature of 25° C.;
b) fabricating a body structure from the first PET-based co-polyester resin, wherein the body structure has a first end with a first opening, a second end with a second opening, a sidewall structure extending between the first end and the second end, and an interior space;
c) sealing the first opening with a first sealing layer; and
d) sealing the second opening with a second sealing layer, wherein each sealing layer comprises a second PET-based co-polyester resin comprising one or more second co-monomers incorporated into the second resin at a second mol %, and
wherein the ratio of the first mole % to the second mol % is less than 1.

13. The method according to aspect 12, wherein the intrinsic viscosity is from about 0.6 dL/g to about 1.2 dL/g.

14. The method according to aspect 12 or 13, wherein the one or more first co-monomers comprises diethylene glycol (DEG) incorporated into the first resin at a mol % from about 0.10 to about 8.0.

15. The method according to aspect 12, 13, or 14, wherein the body structure further comprises one or more oxygen scavengers present from about 0.01% to about 10% by weight of the first polyester or co-polyester resin.

16. The method according to aspect 12, 13, 14, or 15, wherein the syrup dispensing cup has an oxygen transmission rate of less than about $6.0 \times 10^{-3}$ cm$^3$/pkg·day at about 23° C. and 50% relative humidity.

17. The method according to aspect 12, 13, 14, 15, or 16, wherein the syrup dispensing cup has an oxygen transmission rate of less than about $22.8 \times 10^{-5}$ cm$^3$/mL·day at about 23° C. and 50% relative humidity.

18. The method according to aspect 12, 13, 14, 15, 16, or 17, wherein the syrup dispensing cup has a water vapor transmission rate of less than about $4.0 \times 10^{-3}$ g/m$^2$/day at about 37.8° C. and about 90% relative humidity.

We claim:
1. A syrup dispensing cup comprising:
a body structure having a first end with a first opening, a second end with a second opening, a sidewall structure extending between the first end and the second end, and having an interior space, wherein the body structure comprises a first polyester or co-polyester resin comprising one or more first co-monomers incorporated into the first resin at a first mol % and having an intrinsic viscosity from about 0.45 dL/g to about 1.3 dL/g when measured at a temperature of 25° C.;
wherein the first opening is sealed with a first sealing layer and the second opening is sealed with a second sealing layer, each sealing layer comprising a second PET-based co-polyester resin comprising one or more second co-monomers incorporated into the second resin at a second mol %; and
wherein the ratio of the first mole % to the second mol % is less than 1.

2. The syrup dispensing cup according to claim 1, wherein the intrinsic viscosity is from about 0.6 dL/g to about 1.2 dL/g.

3. The syrup dispensing cup according to claim 1, wherein the one or more first co-monomers comprises diethylene glycol (DEG) incorporated into the first resin at a mol % from about 0.10 to about 8.0.

4. The syrup dispensing cup according to claim 1, wherein the body structure further comprises one or more oxygen scavengers present at a concentration from about 0.01% to about 10% by weight of the first polyester or co-polyester resin.

5. The syrup dispensing cup according to claim 1, wherein the syrup dispensing cup has an oxygen transmission rate of less than about $6.0 \times 10^{-3}$ cm$^3$/pkg·day at about 23° C. and 50% relative humidity.

6. The syrup dispensing cup according to claim 1, wherein the syrup dispensing cup has an oxygen transmission rate of less than about $22.8 \times 10^{-5}$ cm$^3$/mL·day at about 23° C. and 50% relative humidity.

7. The syrup dispensing cup according to claim 1, wherein the syrup dispensing cup has a water vapor transmission rate of less than about $4.0 \times 10^{-3}$ g/m$^2$/day at about 37.8° C. and about 90% relative humidity.

8. The syrup dispensing cup according to claim 1, wherein the syrup dispensing cup further comprises a first lid structure that comprises the first sealing layer, an oriented PET-based layer, and an inorganic coating, in which the inorganic coating is located between the first sealing layer and oriented PET-based layer.

9. The syrup dispensing cup according to claim 1, wherein the syrup dispensing cup further comprises a first lid structure that comprises the first sealing layer, a foil layer, and an adhesive, in which the adhesive is located between the first sealing layer and oriented PET-based layer.

10. The syrup dispensing cup according to claim 1, wherein the syrup dispensing cup further comprises a second lid structure that comprises the second sealing layer, an oriented PET-based layer, and an inorganic coating, in which the inorganic coating is located between the second sealing layer and oriented PET-based layer.

11. The syrup dispensing cup according to claim 1, wherein the syrup dispensing cup further comprises a second lid structure that comprises the second sealing layer, a foil layer, and an adhesive, in which the adhesive is located between the second sealing layer and oriented PET-based layer.

12. A method for enhancing the shelf-life of a syrup dispensing cup, the method comprising:
   a) providing a first polyester or co-polyester resin comprising one or more first co-monomers incorporated into the first resin at a first mol % and having an intrinsic viscosity from about 0.45 dL/g to about 1.3 dL/g when measured at a temperature of 25° C.;
   b) fabricating a body structure from the first polyester or co-polyester resin, wherein the body structure has a first end with a first opening, a second end with a second opening, a sidewall structure extending between the first end and the second end, and an interior space;
   c) sealing the first opening with a first sealing layer; and
   d) sealing the second opening with a second sealing layer, wherein each sealing layer comprises a second PET-based co-polyester resin comprising one or more second co-monomers incorporated into the second resin at a second mol %, and
   wherein the ratio of the first mole % to the second mol % is less than 1.

13. The method according to claim 12, wherein the intrinsic viscosity is from about 0.6 dL/g to about 1.2 dL/g.

14. The method according to claim 12, wherein the one or more first co-monomers comprises diethylene glycol (DEG) incorporated into the first resin at a mol % from about 0.10 to about 8.0.

15. The method according to claim 12, wherein the body structure further comprises one or more oxygen scavengers present at a concentration from about 0.01% to about 10% by weight of the first polyester or co-polyester resin.

16. The method according to claim 12, wherein the syrup dispensing cup has an oxygen transmission rate of less than about $6.0 \times 10^{-3}$ $cm^3$/pkg·day at about 23° C. and 50% relative humidity.

17. The method according to claim 12, wherein the syrup dispensing cup has an oxygen transmission rate of less than about $22.8 \times 10^{-5}$ $cm^3$/mL·day at about 23° C. and 50% relative humidity.

18. The method according to claim 12, wherein the syrup dispensing cup has a water vapor transmission rate of less than about $4.0 \times 10^{-3}$ $g/m^2$/day at about 37.8° C. and about 90% relative humidity.

* * * * *